A. H. LEIPERT.
ADJUSTING AND LOCKING RING FOR ROLLER BEARINGS.
APPLICATION FILED MAY 28, 1920.

1,372,624.

Patented Mar. 22, 1921.

WITNESS

INVENTOR
August H. Leipert
BY
Redding & Greeley
ATTORNEYS

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

ADJUSTING AND LOCKING RING FOR ROLLER-BEARINGS.

1,372,624.

Specification of Letters Patent. Patented Mar. 22, 1921.

Application filed May 28, 1920. Serial No. 384,832.

*To all whom it may concern:*

Be it known that I, AUGUST H. LEIPERT, a citizen of the United States, residing in the borough of Queens of the city of New York, in the State of New York, have invented certain new and useful Improvements in Adjusting and Locking Rings for Roller-Bearings, of which the following is a specification, reference being had to the accompanying drawing, forming a part hereof.

Roller bearings after being adjusted must be maintained in adjusted position by devices which can be locked positively against movement and yet which will admit of further adjustment by simple manipulation, as the bearing wears. Devices heretofore employed have not been entirely satisfactory since the adjusting or locking ring has never been of such character as to be positive in its set or, if positive, easy of manipulation for casual adjustments. By the present improvements it is sought to provide an adjusting and locking ring for roller bearings which will provide a positive lock for the bearing race and which may be readily manipulated for casual adjustment of the race as may be necessary. The improved devices are made up in two parts comprising an unthreaded locking ring and an adjusting nut adapted to be engaged with the ring in such manner as to prevent its accidental movement. A suitable embodiment of the invention is illustrated in the drawing, in which—

Figure 1:
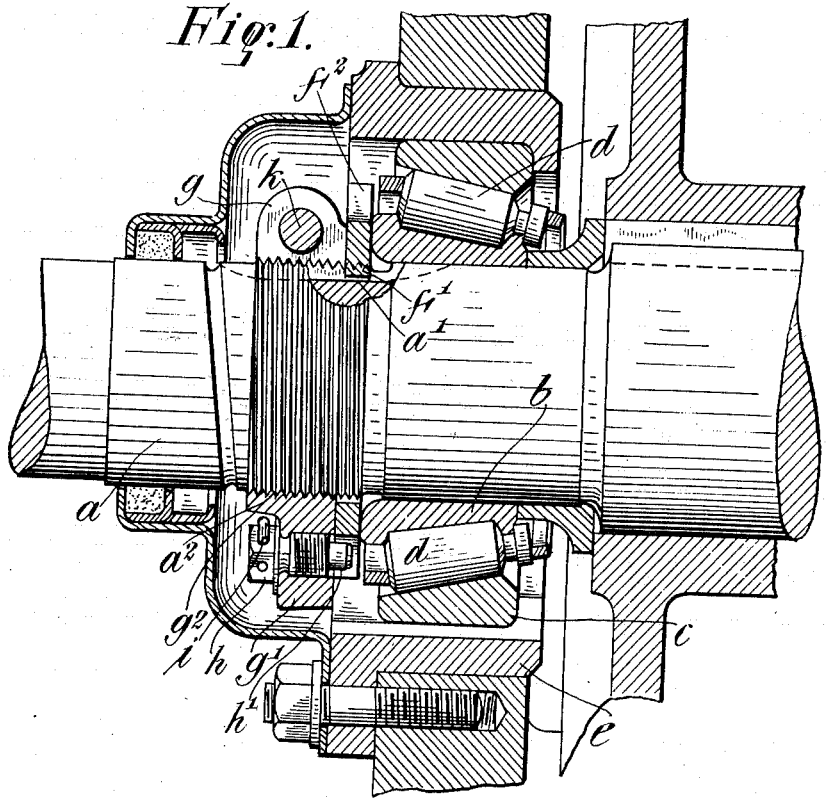
Figure 1 is a fragmentary view in transverse section of a roller bearing with which is associated the improved adjusting nut and locking ring.
Figure 2:
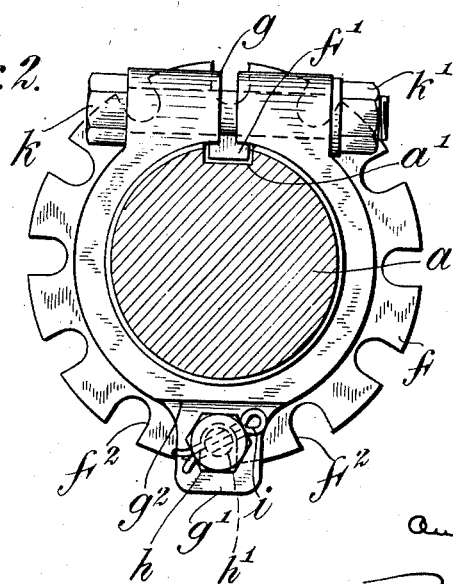
Fig. 2 is a view in section taken on the plane at right angles to the section of Fig. 1 showing the adjusting nut and locking ring in end elevation.

The improved devices are not to be limited in their application to roller bearings for use in any particular situation but in the illustrated embodiment there is shown a wheel axle $a$ on which is mounted the inner race $b$ of a roller bearing and an outer race $c$ and a plurality of rollers $d$ between said races in accordance with the usual practice. The bearing members $b$ and $c$ may support a vehicle hub indicated at $e$. The problem is to adjust the bearing races and lock them in adjusted position until such time as further adjustment becomes necessary. In accordance with the present invention the shaft $a$ has a milled slot $a'$ extending longitudinally thereof along its periphery from a point outward from the bearing race $b$. A locking ring $f$ made to slide over the axle $a$ readily has formed on its inner periphery a tongue $f'$ which fits loosely in the groove $a'$ so as to hold the ring against rotative movement while permitting its axial movement. The outer periphery of the ring $f$ has a series of slots $f^2$ formed therein for a purpose which will appear. The shaft $a$ is threaded as at $a^2$ from a point extending outward from the bearing race $b$ and on to this portion $a^2$ is threaded a split adjusting nut $g$. This nut is formed with a lug $g'$ at one side thereof to receive a locking screw $h$ which, when the nut is turned to desired position, is threaded through the lug and has an end $h'$ of reduced diameter to engage one of the milled slots $f^2$ in the periphery of the locking ring $f$. The screw $h$ can be held against accidental dislodgment by means of a cotter pin $i$ adapted to pass through the head of the screw and engage a shouldered section $g^2$ of the nut $g$. A further means of locking the adjusting nut $g$ in fixed position on the shaft $a$ is through the bolt $k$, which passes through the free ends of the split nut and is engaged by a nut $k'$ which can be set up on such part as practically to clamp the nut $g$ on the shaft against rotation.

From the description given, the manner of use and advantages of the improved devices should be evident. The locking ring $f$ when slipped on the shaft has its tongue $f'$ engaged with the slot $a'$ and is slid into engagement with the roller bearing to be adjusted. The adjusting nut $g$ is then threaded on to the shaft $a$ until it bears against the ring $f$ and forces the roller bearing into the desired adjusted position. At this time the mechanic will bring one of the slots $f^2$ in the periphery of the ring $f$ into substantial alinement with the lug $g'$ on the nut $g$ so that the locking screw $h$ can be readily threaded through the lug and engaged with the ring. The cotter pin $i$ when inserted through the head of the screw $h$ will coöperate with the shoulder $g^2$ to hold the screw against turning. The nut $k'$ is then tightened until the adjusting nut $g$ is further clamped on to the threaded portion $a^2$ of the shaft. By the construction described it is evident that the bearing is held in adjusted position by elements which are positively interengaged and locked and cannot become loosened accidentally. On the other hand, when further adjustment of the bearing is desired the screw $h$ can be readily backed out of engagement with the locking ring $f$, the nut $k'$ on the bolt $k$ loosened and the adjusting nut $g$ moved along the threads $a^2$ until the desired further adjustment of the roller bearing is obtained.

The devices are simple in construction, inexpensive, certain in action and permit a ready assembling and manipulation for adjusting.

I claim as my invention:

1. Adjusting means for bearings on a shaft comprising a ring slidable on the shaft but engaged therewith to be held against rotative movement, an adjusting nut threaded on the shaft, and means engaging the ring and the nut to hold the latter against rotation.

2. Adjusting means for bearings on a shaft comprising a ring slidable on the shaft but engaged therewith to be held against rotative movement, an adjusting nut threaded on the shaft and adapted to engage the ring, and a member passing through the nut and engaging the ring.

3. Adjusting means for bearings on a shaft comprising a ring having a tongue on its inner periphery to engage a slot in the shaft to hold the ring against rotative movement while permitting axial movement, said ring having a series of recesses, an adjusting nut threaded on the shaft and adapted to engage the ring, and a screw passing through the nut and engaging one of the recesses in the ring.

4. Adjusting means for bearings on a shaft comprising a ring having a tongue on its inner periphery to engage a slot in the shaft to hold the ring against rotative movement while permitting axial movement, said ring having a series of recesses, a split adjusting nut threaded on the shaft and adapted to engage the ring, a screw passing through the nut and engaging one of the recesses in the ring, and a bolt passing through the free ends of the adjusting nut.

5. Adjusting means for bearings on a shaft comprising a ring having a tongue on its inner periphery to engage a slot in the shaft to hold the ring against rotative movement while permitting axial movement, said ring having a series of slots on its outer periphery, an adjusting nut threaded on the shaft and adapted to engage the ring, a lug on the nut, and a screw passing through the lug and engaging one of the slots in the ring.

6. Adjusting means for bearings on a shaft comprising a ring having a tongue on its inner periphery to engage a slot in the shaft to hold the ring against rotative movement while permitting axial movement, said ring having a series of slots in its outer periphery, a split adjusting nut threaded on the shaft and adapted to engage the ring and provided with a shoulder, a bolt passing through the free ends of the split nut, a screw passing through the nut and engaging one of the slots in the ring and a cotter pin passing through the head of the screw and engaging the shoulder of the nut.

This specification signed this 25th day of May, A. D. 1920.

AUGUST H. LEIPERT.